United States Patent [19]

Yan

[11] Patent Number: 5,080,799
[45] Date of Patent: Jan. 14, 1992

[54] HG REMOVAL FROM WASTEWATER BY REGENERATIVE ADSORPTION

[75] Inventor: Tsoung Y. Yan, Philadelphia, Pa.

[73] Assignee: Mobil Oil Corporation, Fairfax, Va.

[21] Appl. No.: 527,466

[22] Filed: May 23, 1990

[51] Int. Cl.$^5$ ............................................. C02F 1/28
[52] U.S. Cl. ..................................... 210/661; 55/72; 55/74; 210/673; 210/678; 210/679; 210/688; 210/914
[58] Field of Search ............... 55/54, 59, 61, 72, 74, 55/75; 210/661, 673, 678, 679, 688, 914

[56] References Cited

U.S. PATENT DOCUMENTS

| | | | |
|---|---|---|---|
| 2,860,952 | 11/1958 | Bergeron et al. | 23/134 |
| 3,674,428 | 7/1972 | Dean et al. | 23/134 |
| 3,749,761 | 7/1973 | Dean et al. | 423/562 |
| 3,755,161 | 8/1973 | Yokota et al. | 210/914 |
| 3,790,370 | 2/1974 | Lalancette | 75/108 |
| 3,847,598 | 11/1974 | Coulter et al. | 75/121 |
| 4,053,401 | 10/1977 | Fukushima et al. | 210/52 |
| 4,094,777 | 6/1978 | Sugier et al. | 210/679 |
| 4,147,626 | 4/1979 | Findlay et al. | 210/52 |
| 4,474,896 | 10/1984 | Chao | 502/216 |
| 4,946,596 | 8/1990 | Furuta et al. | 210/914 |

FOREIGN PATENT DOCUMENTS 2310795 6/1979 France.

Primary Examiner—Ivars Cintins
Attorney, Agent, or Firm—Alexander J. McKillop; Charles J. Speciale

[57] ABSTRACT

In a method for removing mercury from a wastestream to produce an environmentally acceptable discharge, the wastestream is contacted with an effective amount of an adsorbent composition which includes a metal compound capable of forming an amalgam and/or a sulfide with mercury and a support. After contact, the treated wastewater is discharged amd the adsorbent composition is regenerated. A method for making the adsorbents is also provided.

28 Claims, 8 Drawing Sheets

Wastewater Treating

HG REMOVAL FROM WASTEWATER BY REGENERATIVE ADSORPTION

BACKGROUND OF THE INVENTION

The invention relates to a direct method for removing mercury from wastestreams by regenerative adsorption.

It is desirable to remove mercury from the liquid discharge from various industrial processes, particularly to meet environmental concerns. Mercury may be present, for example, in the effluents from chlor-alkali plants, in water produced from gas and oil fields and in the discharge from power plants and certain petroleum refining processing units.

The mercury concentration permissible in drinking water under Environmental Protection Agency guidelines is about two parts per billion. The solubility of Hg in water depends on the purity of the water. The solubility of pure mercury in pure drinking water is about 20 to 30 ppb, but the solubility increases with alkalinity and mercury solubility can be as high as 54 ppb in aqueous 5% potassium hydroxide solution, increasing to 135 ppb in aqueous 10% potassium hydroxide. The mercury content in water from a reflux condenser of a crude oil tower used in petroleum processing was found to be greater than 100 ppb.

The mercury in wastewater can contaminate the ground through adsorption. In addition, mercury in the ground or in waterways converts quite readily to volatile, toxic alkyl mercury. Because of its high vapor pressure, the alkyl mercury can escape into the air resulting in air pollution.

An indirect method for removing mercury from wastewater has been proposed in U.S. patent application Ser. No. 297,157 filed Jan. 17, 1989, now U.S. Pat. No. 4,962,276. In this indirect method, mercury is stripped from the wastewater using a stripper gas such as $N_2$ or air. The mercury-containing gas is then treated over an adsorbent. For 90% Hg removal, 1000 cc of $N_2$ per cc of wastewater may be required so that the cost of gas compression becomes significant. A direct method for removing mercury from wastewater by causing the mercury to react directly with an adsorbent would eliminate this cost.

Various processes have been disclosed for removing mercury from liquids. U.S. Pat. Nos. 2,860,952, 3,674,428, 3,749,761, 3,790,370, 3,847,598, 4,053,401, 4,147,626 and 4,474,896 describe methods for reducing the mercury content of aqueous solutions. In U.S. Pat. Nos. 2,860,952, 3,674,428, 3,749,761, 3,790,370, 4,053,401 and 4,147,626, a sulfur-containing compound is added to the effluent to be treated resulting in an insoluble sulfide product which is then removed. In U.S. Pat. No. 3,847,598, a stream of inert gas is passed through the aqueous solution in the presence of a reducing agent which reduces inorganic mercury compounds to elemental mercury.

Various adsorbents have been described for removing mercury from hydrocarbon-containing liquid or gaseous streams. U.S. Pat. No. 4,474,896 describes a mercury adsorbent having a polysulfide and a metal cation on a support. French Patent No. 75/15579 discloses a pelletized regenerable adsorber mass containing a support of silica and/or alumina compounds with crystallites of gold, silver, or copper compounds which have been impregnated onto the support. The adsorbent is used to eliminate mercury from natural gas containing up to 50 Mg Hg/$m^3$ of gas. The problems confronted in removing mercury from streams which are primarily hydrocarbon differ from the problems which exist in removing mercury from wastestreams which are primarily aqueous. The concentration of mercury in wastestreams from industrial processes can be much higher than the mercury content of natural gas. Mercury in wastewaters from chlor-alkali plants is particularly high. In addition, hydrocarbon contaminants and inorganic compounds present in the wastewater, for example, from petroleum processing can compete with mercury for adsorption to reduce the effective removal of mercury and reduce the capacity of the adsorbent. An adsorbent which is selective for Hg over contaminants in the wastewater and a process for removing Hg selectively from wastewater are clearly needed.

The use of sodium borosulfide has been suggested for removing Hg from wastewaters by Cook, et al. Pollution Eng. 36-38, December 1981. Sodium hydrosulfide and sodium polysulfides have been used for Hg removal by Findlay, et al. Environmental Science & Technology 15 (No. 11) 1298-1390 (1981). However, wastewaters often contain other compounds which also react with the treating agent resulting in high chemical consumption and generation of new waste for disposal.

It is therefore an object of the invention to provide a direct adsorption method for removing mercury from wastestreams which contain mercury.

SUMMARY OF THE INVENTION

A method is provided for effectively removing mercury from a wastestream to produce an environmentally acceptable discharge. The wastestream is contacted with an effective amount of an adsorbent composition having a particle size of from about 4 to about 200 mesh to effect removal of mercury. The adsorbent composition includes a metal compound which reacts with mercury or forms an amalgam with mercury on a support. After contacting, the treated wastestream is discharged and the adsorbent composition is regenerated.

A composition for adsorbing mercury from a wastestream may be prepared, for example, by vacuum impregnating activated carbon with an aqueous solution of a metal salts, such as copper sulfate, copper chloride and copper nitrate drying the impregnated carbon, then calcining by slowly raising the temperature to a maximum of about 450°-500° F., and sulfiding.

More particularly, a method is provided for removing mercury from an aqueous wastestream to produce an environmentally acceptable discharge by providing an adsorber vessel containing adsorbent composition, introducing the wastestream into the adsorber vessel and into contact with the adsorbent composition therein, removing and discharging the contacted wastestream, introducing a hot gas stream into the adsorber vessel and into contact with wastewater-contacted adsorber composition to remove the mercury, thereby regenerating the adsorber composition, removing the hot gas stream from the adsorber vessel, and removing the mercury from the hot gas by contact with a sulfur/carbon adsorbent.

Advantageously, the concentration of mercury in a discharged wastestream is reduced to environmentally acceptable levels to avoid mercury contamination of the ground and atmosphere. In addition, mercury removal from aqueous wastestreams is effected even in the presence of organic and inorganic contaminants which can interfere with mercury adsorption. Furthermore, the adsorbents of the invention not only have very long life cycles, but also can be efficiently regenerated to extend their ultimate life. Long ultimate life reduces problems of disposing of the used adsorbent.

For a better understanding of the present invention, together with other and further objects, reference is made to the following description, taken together with the accompanying drawings, and its scope will be pointed out in the appended claims.

DETAILED DESCRIPTION OF THE INVENTION

Figure 1:
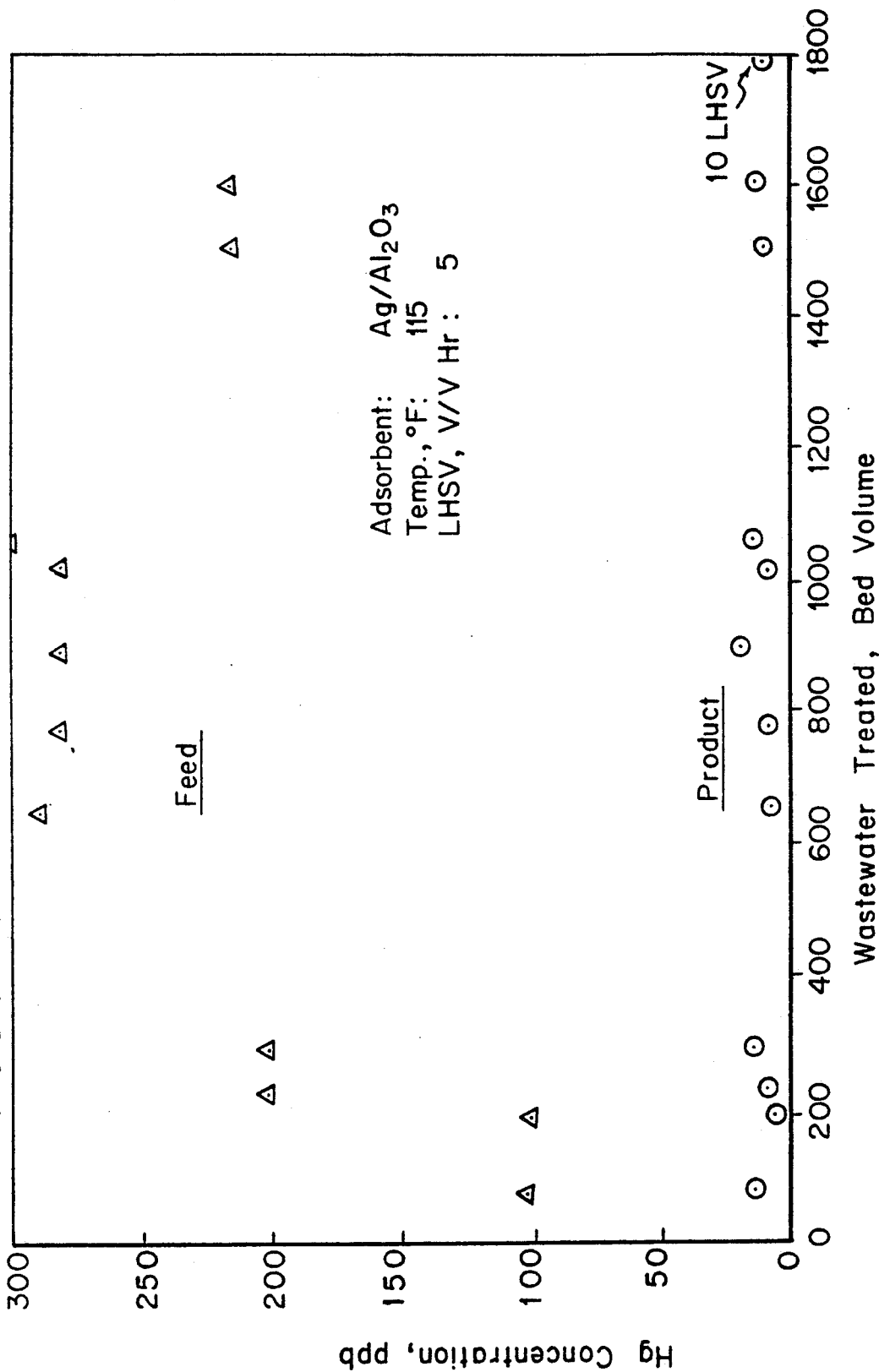
FIG. 1 is a graph illustrating the use of adsorbent composition to remove Hg from water at 5 VVH.

A mercury adsorber is used for directly adsorbing mercury from a waste stream as the stream is passed through the adsorber. The adsorber includes at least one metal compound capable of forming an amalgam and/or sulfide with mercury, the metal compound being dispersed onto a support. Useful metals include bismuth, copper, iron, gold, silver, tin, zinc and palladium and their mixtures. The metallic component may be in the form of elemental metal, metal oxide, metal sulfide or mixture thereof.

Useful supports are those having high surface areas of about 10 to 1000 $m^2/g$ such as $Al_2O_3$, $SiO_2$, $SiO_2/Al_2O_3$, zeolites, clays and active carbon. Particularly preferred as a support is active carbon having a surface area of from about 300 $m^2/g$ to about 1000 $m^2/g$. Therefore, the adsorbents may be in the form of, for example, $Ag/Al_2O_3$, $CuS/C$, $CuS/Al_2O_3$, $FeS/Al_2O_3$, $FeS/C$, $Bi/Al_2O_3$, Ag/zeolite A, $CuO/C$. The support is capable of contributing to overall Hg adsorption. We were surprised to find that the active carbon is a particularly effective contributor to mercury removal in this process.

The mercury adsorbent may be made by impregnating a support compound with metal or metal compound. The support may be impregnated with a metal by contacting with a solution of the metal salts followed by drying at about 300°-500° F. for about 1-10 hours, calcination by slowly raising the temperature to 450°-500° F., reduction and/or sulfiding, by chemical vapor deposition, or by ion exchange using the metal ions. In addition, the adsorbent can also be prepared by mixing the metal salts and the support. The impregnated support may be sulfided by distributing sulfur onto the calcined impregnated support, passing a stream of liquid oil or water through at a pressure of from 0 to about 1000 psig, a temperature of about 200°-500° F. for about 5-10 hours. The sulfiding may also be carried out by passing a gas containing from about 1% to about 10% $H_2S$ or an aqueous solution of 0.1-15% polysulfide through the calcined impregnated support at a pressure of from 0 to about 1000 psig, a temperature of from about ambient to about 500° F. for about 1-10 hours. In a preferred embodiment, the adsorbent is crushed or otherwise treated to achieve a particle size of from about 2 to about 200 mesh. We discovered that in order to improve its activity for mercury adsorption, the drying, calcination, reduction or sulfiding steps should not exceed 550° F., and preferably should be conducted below 500° F.

Even though they are not optimal, some commercial adsorbents ordinarily used for other processes can be used in this application. Some suitable commercial preparations are $Ag/Al_2O_3$ which has been conventionally used in the oxidation of ethylene to ethylene oxide and $CuO/Al_2O_3$ conventionally used for the adsorption of $H_2S$ and arsenic compounds.

The adsorbent is preferably sulfided to form, for example, $CuS/C$, $CuS/Al_2O_3$, $FeS/C$, $FeS/Al_2O_3$. The adsorbent may also be used in unsulfided form, e.g., $Ag/Al_2O_3$, $Bi/Al_2O_3$, Ag/zeolite A.

The adsorbent may be used in the form of a solid fixed bed or a fluidized bed. In a fixed bed, the adsorbent may be in the form of pellets or granules. In a fluidized bed, granules and/or spherical particles are generally used.

Wastewater streams contain both organic and inorganic compounds which compete with mercury for adsorption. Thus, the adsorbent must have high selectivity for Hg. Since adsorbents do not have unlimited life expectancies, they must eventually be regenerated. Preferred adsorbents are those which are selective for Hg over other contaminants, have long life cycles and are readily regenerable. The high selectivity is achieved by choosing the adsorbent and conditions for adsorbency such that Hg chemically reacts selectively with the adsorbent. The life cycle of adsorbents is determined by the mercury adsorption capacity of the adsorbent, by the mercury selectivity of the adsorbent, by the mercury content of the wastewater, and by the liquid hourly space velocity (LHSV) of the process operation. The ultimate life of the adsorbent can be extended by regeneration and rejuvenation. It is important to extend the ultimate life of the adsorbent to minimize the problem in disposing of the used adsorbents.

The life cycles of the adsorbents used in the invention are surprisingly long, for example, up to about 300 days when used for treating wastewater containing about 20 ppb Hg at 10 LHSV, due to their high adsorption capacity and selectivity for Hg. They can also be repeatedly regenerated at least about 5 times. Thus, the ultimate life of the adsorbent under such condition can be as long as 5 years.

It is thought that the adsorbent removes mercury from fluids by forming amalgam and other mercury compounds. The mercury vapor pressures of the amalgam and mercury compounds are substantial and increase rapidly with increase in temperature. Thus, the adsorbent can be regenerated by heating to drive off the Hg. The adsorbent can be regenerated by using a low grade heat source, e.g. by heating with hot gases, flue gas or steam. It was discovered that by increasing the temperature of the mercury-laden adsorbent by 100° C. above the adsorption temperatures, over 90% of the adsorbed Hg can be removed. In treating the wastewater from petroleum processing, the low grade heat source may be raw hot gas from the well. The adsorbent can also be regenerated using hot flue gas by use of an in-line heater for direct fuel combustion. Steam can also be used as the regeneration gas.

The Hg containing regeneration gas can be passed over another adsorbent such as S/carbon or returned to the raw gas stream directly. The S/carbon adsorbent is preferred in this step because of its high activity and capacity for Hg removal from the gaseous stream.

To achieve a continuous operation, two reactors can be used in the system so that one reactor is on adsorption cycle and another is on regeneration cycle. When the operation cycle is long, a continuous operation may not be necessary and a single reactor could be adequate.

The adsorbent can be regenerated by heating with hot gas. The temperature of the hot gas used for regeneration is preferably 300° F. or higher. Oxidative regeneration can also be used to restore the activity and the capacity of the adsorbent. After oxidative regeneration, the adsorbents can be resulfided for use in the second cycle. For effective mercury removal, contamination of the equipment must be avoided. To avoid mercury contamination, the regeneration gas/stream should be reversed from that of the adsorption operation.

Figure 8:
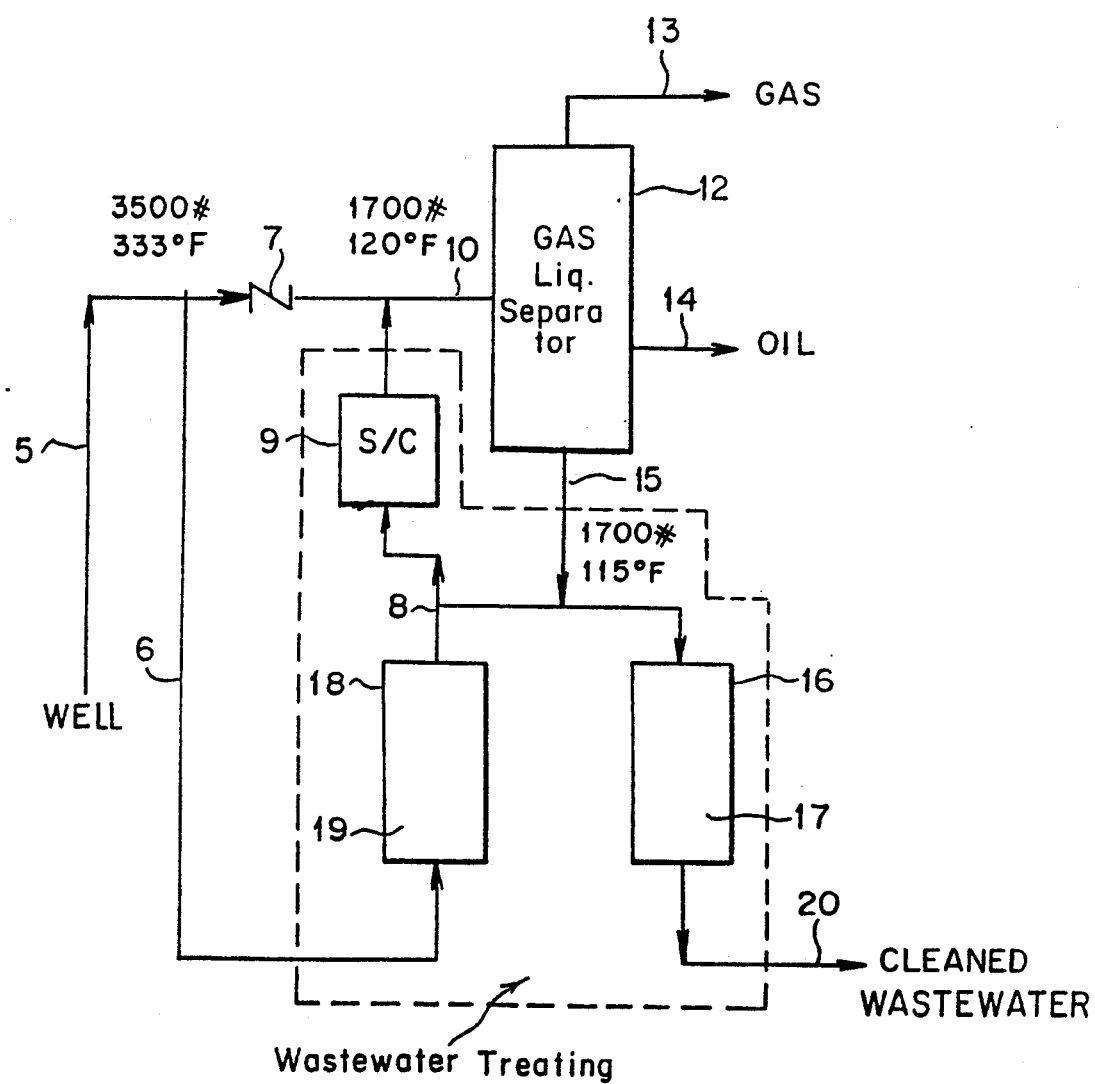
FIG. 8 is a flow diagram illustrating the method for removal of Hg from wastewater and regeneration of the adsorbent composition.

The drawing in FIG. 8 illustrates one embodiment of the invention for treating produced water from a natural gas and oil field.

Referring to FIG. 8, a hot, pressurized raw gas stream 5 emerging from a gas/oil well is first cooled and somewhat reduced in pressure with a heat exchanger 7 then the cooled stream 10 is introduced into a gas-liquid separator 12 which separates the feedstream into gas 13, oil 14, and waste water 15 streams. The waste water stream 15 which is now at about 115° F. and 1700 psi is introduced into an adsorber vessel 16 containing fresh adsorbent 17. Meanwhile in a regeneration vessel 18, Hg-laden adsorbent 19 is regenerated. The processes of adsorption and regeneration may be conducted in a vapor, vapor/liquid or liquid phase.

The process conditions inside the adsorber vessel 16 may include a pressure of from about zero to about 3000 psi, preferably from about zero to about 2000 psi; a temperature of from about 50° F. to about 570° F., preferably from about 70° F. to about 300° F., a liquid hourly space velocity (LHSV), ratio of volume of feed to volume of adsorbent per hour (V/V Hr) of from about 0.1 to about 100 LHSV, preferably from about 1 to about 20 LHSV.

The clean water stream 20 emerging from adsorber vessel 16 has a mercury level which is reduced to a level of from about 0.5 to about 20 ppb or to meet acceptable environmental standards, and is discharged.

The mercury-laden adsorbent can be regenerated by heat treatment in the regeneration vessel 18 using a regeneration bas stream 6 of the hot raw gas 5 which emerges from the well. The regeneration gas stream 6 is introduced into the Hg-laden adsorbent contained in vessel 18 under the appropriate conditions so that the regeneration gas removes Hg from the Hg-laden adsorbent and the regeneration gas becomes Hg-laden. The Hg-laden regeneration gas stream 8 emerges from the regeneration vessel, is cooled to below 200° F. and is passed over a S/carbon adsorber 9 to remove Hg or stream 8 can be returned to the raw gas stream 10 directly. The S/carbon adsorber removes Hg from the stream by forming solid HgS which is stable and requires high temperature for decomposition. Of course, at high temperatures sulfur also sublimes and is stripped off by the regeneration gas and the activity of the S/C adsorber for Hg is lost. Thus, the temperature of stream 8 should be reduced to below 200° F. by cooling.

The ranges of process variables for regeneration include a temperature of from about 120° F. to about 1100° F. with from about 300° F. to about 850° F. preferred, and a gas flow rate, V/V Hr (volume of gas at atmospheric pressure per volume of adsorbent per hour) of from about 1000 to about 100,000 with from about 5000 to about 50,000 preferred, and a time of about 0.5 to 20 hours.

Example A

Preparation of Adsorbent 100g of activated carbon in powder form having a surface area of about 700m$^2$/g is vacuum impregnated with a 100 cc of a 2M aqueous solution of cupric sulfate. The impregnation can be done at about 120° F. to improve the solubility of $CuSO_4$ in water. In order to achieve a high level of copper on the support, the impregnation can be repeated, or a continuous process may be used in which the impregnation solution is continuously added while the water in the adsorbent is vaporized. Copper nitrate may also be used. After impregnation, the composition is dried at 200° F. for two hours and then calcined by slowly raising the temperature at a rate of 2° F./minute up to about 450°-500° F. The resulting composition is CuO/C having about 15% CuO.

The CuO/C may be sulfided using any of the following methods:

1. Hydrogen gas containing about 1-5% $H_2S$ is passed over the CuO/C at room temperature. Nitrogen may be used instead of hydrogen. A resulting reaction has the formula

   $H_2S + CuO/C \rightarrow CuS/C + H_2O + heat$ and occurs very quickly.

2. Sulfur in powder or granular form in an amount of about 5-10% by weight is placed in the top half of a layer of CuO/C contained in a reaction vessel. A liquid such as oil or water is forced under a pressure of 0-1000 psi through the layer from top to bottom at a temperature of about 200°-500° F. for about 5-10 hours. The sulfur is thereby melted, dissolved distributed throughout the layer and reacted according to the formula:

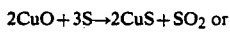
   $2CuO + 3S \rightarrow 2CuS + SO_2$ or

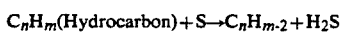
   $C_nH_m(\text{Hydrocarbon}) + S \rightarrow C_nH_{m-2} + H_2S$

   $CuO + H_2S \rightarrow CuS + H_2O$

3. An aqueous solution of 0.1-0.15% sodium polysulfide is pumped through the CuO/C contained in a reaction vessel at ambient temperature and 0 to 1000 psig for a sufficient time until the polysulfide is detectable at an outlet in the vessel. The time is generally about 1-13 hours depending on the concentration of the sodium polysulfide and the pump rate. The product is CuS/C.

Experiments were conducted to demonstrate the efficacy of the process for the removal of mercury from wastestreams and the high capacity of the adsorbents for Hg removal. The selectivities of the adsorbents for Hg over other contaminants were also demonstrated.

For purposes of the following examples, feeds simulating wastewaters were prepared by equilibrating demineralized water with excess amounts of mercury. The organic and oil contaminants of wastewaters were simulated by adding organic surfactants. The water was analyzed for mercury with a Jerome 301instrument. The instrument provides accurate Hq determination as confirmed by neutron activation analyses. Repeated analysis was carried out to insure measurement accuracy. The Hg contents of the feed water varied and exceeded that of pure water.

EXAMPLES 1-14

In these examples, the adsorbent was commercially available $Ag/Al_2O_3$ with an Ag content of 3.5 wt %. The $\frac{1}{8}''$ beads were crushed and sized to 18-40 mesh according to Tyler screen analysis. One cc of the crushed $Ag/Al_2O_3$ was charged to a 0.4 mm ID Pyrex tube reactor. Mercury-containing feed water was pumped through the reactor at the desired rate and at a temperature of 115° F. and 1700 psi. The mercury content of the feed varied from about 100 to 300 ppb. The effluent was analyzed for mercury. The results are shown in FIG. 1 and below in Table 1:

TABLE 1

Hg Removal From Water
Adsorbent = 3.5% $Ag/Al_2O_3$
Temp., °F. = 115

| Example | LHSV V/V/Hr | Bed Volume | Hg ppb Feed | Hg ppb Prod. | Hg Removal % |
|---|---|---|---|---|---|
| 1 | 5 | 15 | 102 | 15 | 85.3 |
| 2 | 5 | 82 | 102 | 7 | 93.1 |
| 3 | 5 | 190 | 200 | 11 | 94.5 |
| 4 | 5 | 228 | 200 | 14 | 93.0 |
| 5 | 5 | 298 | 200 | 16 | 92.0 |
| 6 | 5 | 658 | 289 | 8 | 97.2 |
| 7 | 5 | 778 | 279 | 10 | 96.4 |
| 8 | 5 | 898 | 279 | 20 | 92.8 |
| 9 | 5 | 1018 | 279 | 10 | 96.4 |
| 10 | 5 | 1138 | 305 | 15 | 95.1 |
| 11 | 5 | 1498 | 216 | 11 | 94.9 |
| 12 | 5 | 1603 | 217 | 15 | 93.1 |
| 13 | 10 | 1843 | 235 | 7 | 97.0 |
| 14 | 10 | 2083 | 235 | 9 | 96.2 |

The adsorbent in examples 1-14 was effective for removing mercury from water to levels low enough to meet environmental regulation. At 115° F. and 5 and 10 LHSV the mercury contents were lowered from 100-300 to 10-15 ppb and lower. The corresponding mercury removals were 92-97%.

The adsorption capacity of the adsorbent was surprisingly high. The mercury did not break through even after treating over 2000 bed volumes of the feed water. At 5 LHSV, this corresponds to 13.3 days of operation without regeneration of the adsorbent. Although the process was terminated after a time corresponding to 13.3 days at 5 LHSV, the life cycle is believed to be much longer.

The operation cycle length depends on the Ag content of the adsorbent, the nature of the wastewater, and the operating conditions. It is possible to increase the cycle length of operation by increasing the metal content of the adsorbent. In addition, if there are high levels of contaminants in the feedstream which compete with mercury for adsorption, the operation cycle will be shortened. It was found that the water temperature can be increased to increase the adsorption selectivities for mercury and length of the operation cycle.

EXAMPLES 15-53

In these examples, the adsorbent was CuS/C. The adsorbent was prepared by sulfiding CuO/C with sulfur in natural gas liquid condensate. The properties of the CuO/C were: size 12×30 mesh; Cu, 13 wt. %; bulk density, 38#/ft$_3$; surface area, 550-800m$^2$/g; pore volume, 0.2-0.3 cc/g. The sulfiding was carried out by placing the required amount of sulfur on top of a bed of CuO/C and passing the liquid condensate over the bed at 210° F. The S was dissolved and carried through the bed to sulfide the CuO. The sulfiding was continued for four hours until the sulfur on top of the bed was exhausted.

The adsorbent was crushed and screened to 18×40 mesh for this small scale test unit. The adsorbent in an amount of 0.125 g (0.2 cc) was packed in a ¼ inch stainless steel tube of 0.035 inch wall thickness. The feed water was pumped downflow through the bed using a pump at 110° F. and 20 psig. The pump rate was 20 or 80 LHSV. The product was analyzed for Hg periodically as the volume of feed passed through the bed increased up to 111,008 bed volumes.

In order to assess the Hg loading capacity of the adsorbent, an accelerated test was devised. In the test, Hg-containing nitrogen gas was periodically passed through the bed to load the adsorbent with Hg rapidly and adsorbent efficiency for Hg removal from water was tested at intervals. The approximate quantity of Hg loaded was calculated as the difference between the quantity of Hg in the inlet and outlet of an Hg-containing $N_2$ stream. After loading the adsorbent with increasing levels of Hg, the adsorbent was tested for Hg removal from water.

Loading with Hg-containing gas is shown in Table 2 in terms of increments of mg Hg per g of adsorbent. The addition of Hg following example 22 was 3700 mg Hg/g of adsorbent from $N_2$ gas containing 3249 ppb Hg; 255 mg Hg/g from 63 pp Hg $N_2$ gas was added following example 24, 92 mg Hg/g was added following example 30, and 71 mgHg/g was added following example 30; for a total of 4.118 mg Hg/g of adsorbent.

Figure 2:
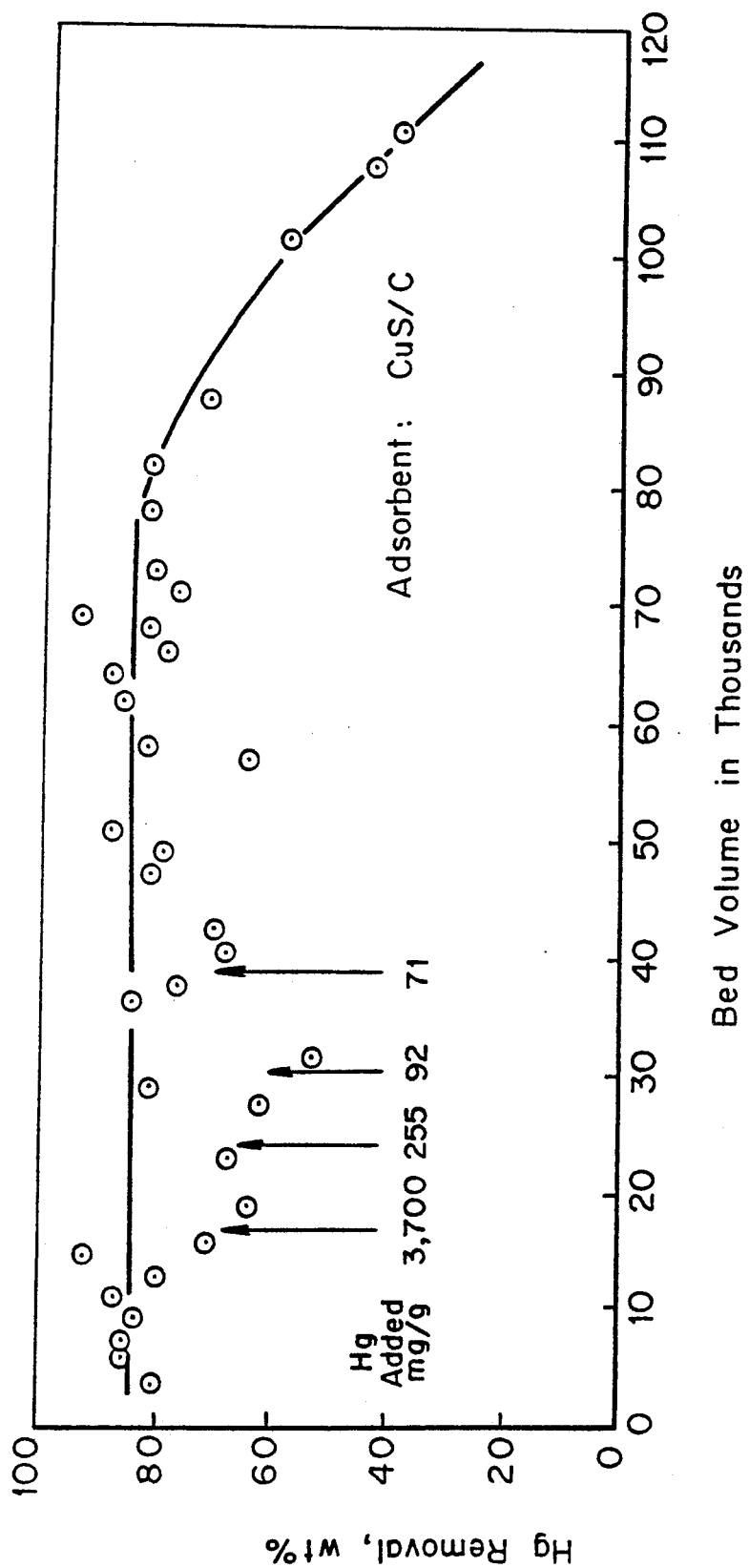
FIG. 2 is a graph illustrating the use of adsorbent composition to remove Hg from water containing high levels of Hg.

The results are shown in FIG. 2 and below in Table 2:

TABLE 2

Hg Removal From Water
Adsorbent: CuS/C
Temp., °F.: 110

| Example | LHSV | Bed Vol. | Hg, ppb Prod. | Hg, ppb Feed | Hg Removed % |
|---|---|---|---|---|---|
| 15 | 80 | 3,624 | 3 | 15.5 | 81 |
| 16 | 80 | 5,544 | 3 | 21.5 | 86 |
| 17 | 20 | 6,987 | 2 | 14.5 | 86 |
| 18 | 80 | 8,904 | 3.5 | 22.5 | 84 |
| 19 | 80 | 10,824 | 3 | 22.5 | 87 |
| 20 | 80 | 12,744 | 4.5 | 22.5 | 80 |
| 21 | 80 | 14,664 | 1.5 | 20.5 | 93 |
| 22 | 20 | 16,104 | 5 | 17 | 71 |
| Loaded 3700 mg Hg/g from $N_2$ Gas containing 3429 ppb Hg | | | | | |
| 23 | 80 | 18,984 | 7.5 | 21 | 64 |
| 24 | 80 | 22,824 | 6.5 | 19.5 | 67 |
| Loaded 255 mg Hg/g from $N_2$ Gas containing 63 ppb Hg | | | | | |

TABLE 2-continued

Hg Removal From Water
Adsorbent: CuS/C
Temp., °F.: 110

| Example | LHSV | Bed Vol. | Hg, ppb Prod. | Hg, ppb Feed | Hg Removed % |
|---|---|---|---|---|---|
| 25 | 80 | 27,624 | 6.5 | 17 | 62 |
| 26 | 20 | 29,064 | 2.5 | 14 | 82 |
| 27 | 20 | 30,024 | 3.5 | 7.5(?) | 53(?) |
| Loaded 92 mg Hg/g from N$_2$ Gas containing 63 ppb Hg | | | | | |
| 28 | 80 | 31,344 | 4.5 | 9.5(?) | 53 |
| 29 | 80 | 36,144 | 3 | 20 | 85 |
| 30 | 20 | 37,584 | 5 | 22 | 77 |
| Loaded 71 mg Hg/g from N$_2$ Gas containing 63 ppb Hg | | | | | |
| 31 | 80 | 40,504 | 7 | 22 | 68 |
| 32 | 80 | 42,424 | 3 | 10 | 70 |
| 33 | 80 | 43,344 | 7.5(?) | 10 | 25(?) |
| 34 | 80 | 46,264 | 8.5(?) | 20.5 | 59(?) |
| 35 | 20 | 47,704 | 2 | 10.5 | 81 |
| 36 | 20 | 49,144 | 1.5 | 7 | 79 |
| 37 | 80 | 51,064 | 2 | 16.5 | 88 |
| 38 | 80 | 52,984 | 0 | 11 | 795 |
| 39 | 80 | 56,824 | 4 | 11 | 64 |
| 40 | 20 | 58,264 | 2 | 11 | 82 |
| 41 | 20 | 62,104 | 1.5 | 10.5 | 86 |
| 42 | 80 | 64,024 | 1.5 | 12.5 | 88 |
| 43 | 80 | 65,944 | 3 | 14 | 79 |
| 44 | 80 | 67,864 | 2.5 | 14 | 82 |
| 45 | 20 | 69,304 | 1 | 15.5 | 94 |
| 46 | 80 | 71,168 | 3.5 | 15.5 | 77 |
| 47 | 80 | 73,088 | 3 | 15.5 | 81 |
| 48 | 20 | 78,368 | 6 | 33 | 82 |
| 49 | 80 | 84,128 | 5 | 28.5 | 82 |
| 50 | 80 | 87,968 | 8 | 28.5 | 72 |
| 51 | 80 | 101,408 | 11 | 27 | 59 |
| 52 | 20 | 108,128 | 15 | 27 | 44 |
| 53 | 20 | 111,008 | 16.5 | 27 | 39 |
| Hg adsorbed from water ≈ 0.25 mg | | | | | |

After being loaded with a total Hg of 4.118 mg/g, the adsorbent remained active for treating another 80,000 bed volumes of water to remove an additional 1.5 mg of Hg. The total adsorption capacity of the adsorber was 5.618 mg Hg/g. From the Hg adsorption capacity, the wastewater treating capacity of the adsorbent can be estimated. At an adsorption capacity of 5.618 mg of Hg per gram, each gram of adsorbant can treat 100,000 g of water containing 50 ppb of Hg. For treating water with 50 ppb Hg at 10 LHSV, the adsorbent will last 254 days. At a lower flow rate of 5 LHSV, the adsorbent will last 508 days. The examples demonstrate the high Hg capacity and long operation cycle possible for the adsorbent.

EXAMPLES 54-94

In these examples the adsorbent was CuS/Al$_2$O$_3$. The adsorbent was prepared by sulfiding CuO/Al$_2$O$_3$ with sulfur in natural gas liquid condensate as described previously. The CuO/Al$_2$O$_3$ was in the form of a ⅛" trilobe extrudate containing 19 wt % of CuO, and was crushed to 18/40 Tyler mesh for these tests.

The adsorbent bed was prepared and tested as in examples 15-53 except that extra Hg loading was not carried out. The LHSV was varied from 4 to 80.

Figure 3:
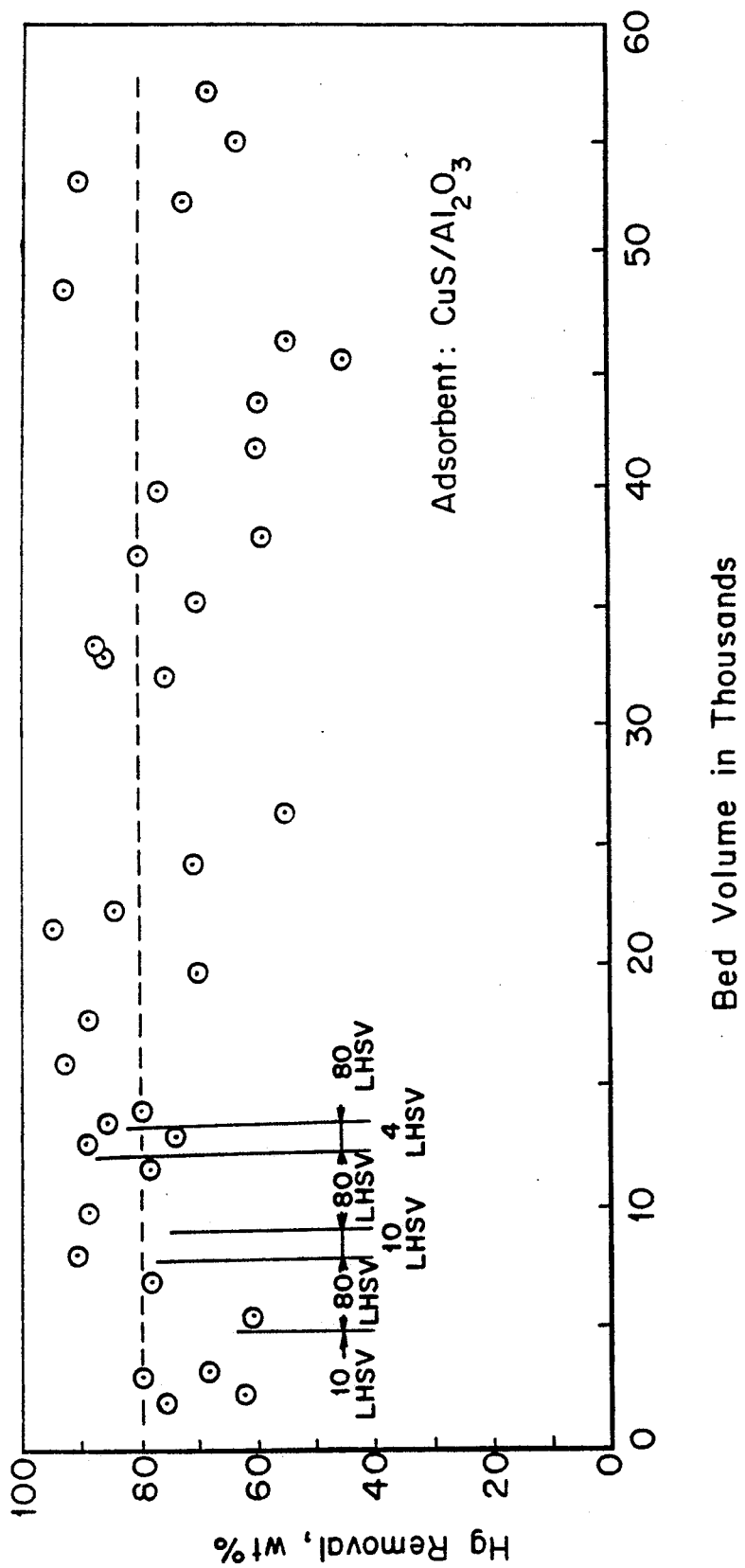
FIG. 3 is a graph illustrating the use of adsorbent composition to remove Hg from water at various LHSV's.

The results are shown in FIG. 3 and Table 3 below:

TABLE 3

Hg Removal From Water
Adsorbent: CuS/Al$_2$O$_3$
Temp., °F.: 110

| Example | LHSV | Bed Vol. | Hg, ppb Prod. | Hg, ppb Feed | Hg Removal % |
|---|---|---|---|---|---|
| 54 | 10 | 1,916 | 9.5 | 40 | 76 |
| 55 | 10 | 2,156 | 17 | 45 | 62 |
| 56 | 10 | 2,876 | 5 | 25 | 80 |
| 57 | 10 | 3,116 | 5 | 16 | 69 |
| 58 | 80 | 5,036 | 9 | 23 | 61 |
| 59 | 80 | 6,956 | 5 | 24 | 79 |
| 60 | 80 | 7,196 | 9 | 27 | 33 |
| 61 | 10 | 8,156 | 2 | 23 | 91 |
| 62 | 80 | 10,076 | 2 | 19 | 89 |
| 63 | 80 | 11,996 | 4 | 19 | 79 |
| 64 | 4 | 13,148 | 2 | 19 | 89 |
| 65 | 4 | 13,244 | 5 | 19 | 74 |
| 66 | 4 | 13,340 | 7 | 16 | 56 |
| 67 | 10 | 13,580 | 3 | 22 | 86 |
| 68 | 20 | 14,300 | 3 | 15 | 80 |
| 69 | 80 | 16,220 | 2 | 27 | 93 |
| 70 | 80 | 18,140 | 3 | 27 | 89 |
| 71 | 80 | 20,060 | 8 | 27 | 70 |
| 72 | 80 | 21,980 | 1 | 21 | 95 |
| 73 | 10 | 22,700 | 3 | 17 | 84 |
| 74 | 80 | 24,620 | 6 | 21 | 71 |
| 75 | 80 | 26,540 | 9 | 20 | 55 |
| 76 | 80 | 28,460 | — | — | — |
| 77 | 80 | 32,300 | 4 | 17 | 76 |
| 78 | 10 | 33,020 | 2 | 14 | 86 |
| 79 | 10 | 33,500 | 1 | 8 | 87 |
| 80 | 80 | 35,420 | 3 | 10 | 70 |
| 81 | 80 | 37,340 | 4 | 20 | 80 |
| 82 | 10 | 38,060 | 9 | 22 | 59 |
| 83 | 80 | 39,944 | 5 | 22 | 77 |
| 84 | 80 | 41,784 | 4 | 10 | 60 |
| 85 | 80 | 43,784 | 4 | 10 | 60 |
| 86 | 80 | 45,704 | 6 | 11 | 45 |
| 87 | 10 | 46,424 | 5 | 11 | 55 |
| 88 | 10 | 46,664 | 8 | 11 | 27 |
| 89 | 80 | 48,584 | 1 | 17 | 94 |
| 90 | 80 | 50,504 | 0 | 11 | 100 |
| 91 | 80 | 52,424 | 3 | 11 | 73 |
| 92 | 10 | 53,144 | 1 | 11 | 91 |
| 93 | 80 | 55,064 | 4 | 11 | 64 |
| 94 | 80 | 56,984 | 4 | 13 | 69 |

These examples demonstrated that CuS/Al$_2$O$_3$ is effective for removing Hg from wastewater. It was effective even at a high flow rate of 80 LHSV. The adsorption capacity of the adsorbent was high. It remained active after treating 56,984 bed volumes (BV) of water, which translates to 237 days of operation cycle at 10 LHSV.

EXAMPLES 95-127

To test the effect of the support on the efficacy of the adsorbent, the carbon support was tested as an adsorbent. An adsorbent bed of active carbon having a mesh size of 12×30 was prepared and tested following the procedures of examples 15-40. The LHSV was varied from 4 to 80.

Figure 4:
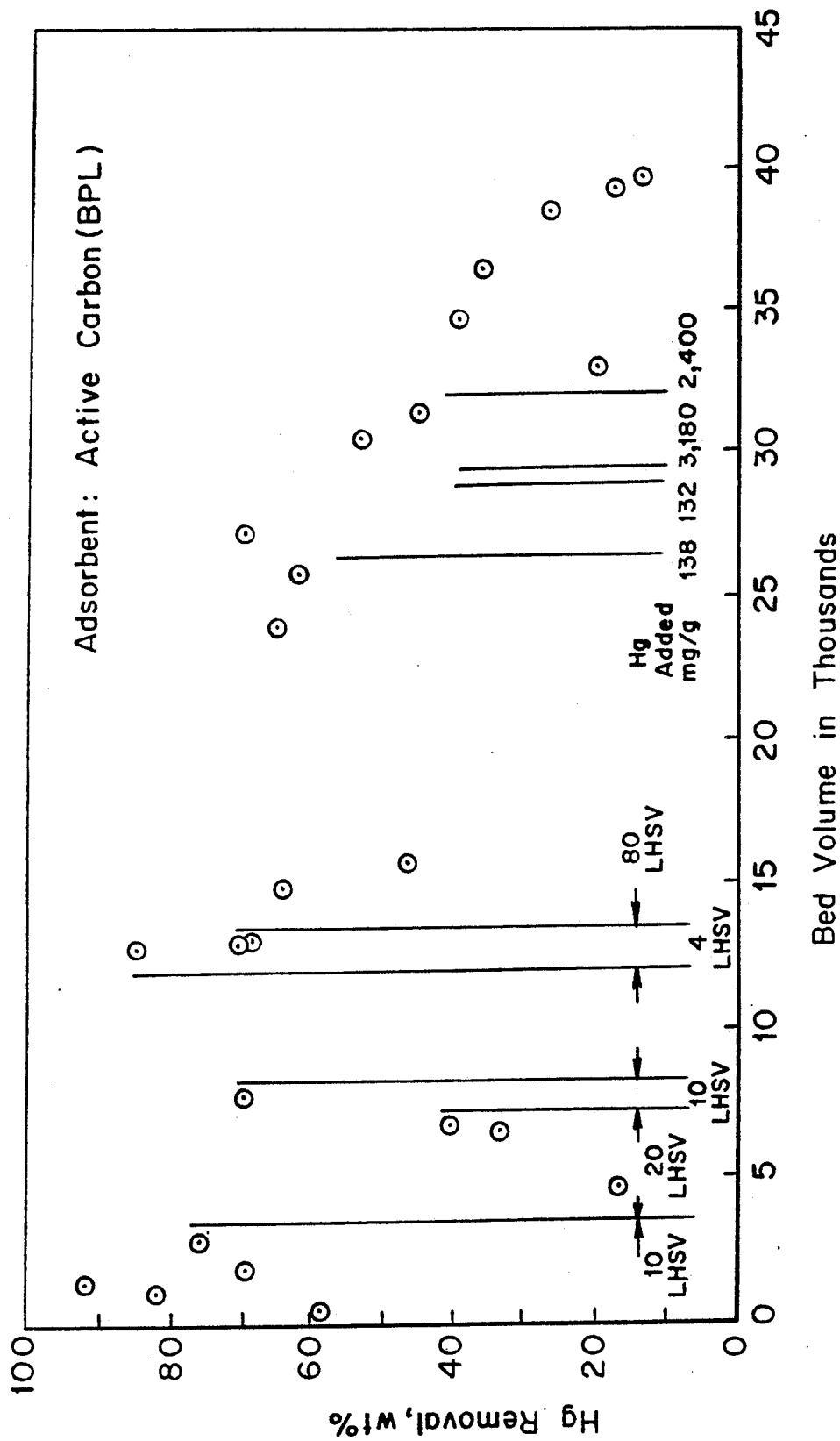
FIG. 4 is a graph illustrating the use of active carbon to remove Hg from water.

Extra Hg was loaded with the use of nitrogen gas as in examples 15-53. The addition of Hg Was 13.8 mg Hg/g following example 118, 13.2 mg Hg/g from N$_2$ gas containing 3429 ppb Hg, then 318 mg Hg/g from N$_2$ gas containing 11,800 ppb Hg were added to the bed following example 119; 240 mg Hg/g was added following example 121. The results are shown in Table 4 and FIG. 4.

TABLE 4

Hg Removal From Water
Adsorbent: Carbon
Temp., °F.: 110

| Example | LHSV | Bed Vol. | Hg, ppb Prod. | Hg, ppb Feed | Hg Removal % |
|---|---|---|---|---|---|
| 95 | 10 | 476 | 9 | 22 | 59 |
| 96 | 10 | 1,196 | 4 | 22 | 82 |
| 97 | 10 | 1,436 | 2 | 24 | 92 |
| 98 | 10 | 1,676 | — | 40 | — |
| 99 | 10 | 1,916 | 12 | 40 | 70 |
| 100 | 10 | 2,156 | 8 | 45 | 82 |
| 101 | 10 | 2,876 | 6 | 25 | 76 |
| 102 | 20 | 4,796 | 19 | 23 | 17 |
| 103 | 20 | 6,716 | 16 | 24 | 33 |
| 104 | 20 | 6,956 | 16 | 27 | 41 |
| 105 | 10 | 7,916 | 7 | 23 | 70 |
| 106 | 80 | 9,836 | 6 | 19 | 68 |
| 107 | 80 | 11,756 | 8 | — | — |
| 108 | 4 | 12,908 | 3 | 20 | 85 |
| 109 | 4 | 13,004 | 6 | 20 | 70 |
| 110 | 4 | 13,100 | 5 | 16 | 69 |
| 111 | 80 | 15,020 | 8 | 22 | 64 |
| 112 | 10 | 15,740 | 8 | 15 | 47 |
| 113 | 80 | 17,660 | 5 | 27 | 83 |
| 114 | 80 | 19,580 | 9 | — | — |
| 115 | 80 | 21,500 | — | — | — |
| 116 | 80 | 23,420 | 4 | 21 | 81 |
| 117 | 10 | 24,140 | 6 | 17 | 65 |
| 118 | 80 | 26,060 | 8 | 21 | 62 |
| Loaded 13.8 mg Hg from N₂ gas containing 3429 ppb Hg | | | | | |
| 119 | 80 | 27,420 | 6 | 20 | 70 |
| Loaded 31.2 mg Hg and then 318 mg from N₂ gas containing 3429 and 11,800 ppb Hg, respectively | | | | | |
| 120 | 80 | 30,620 | 9 | 20 | 55 |
| 121 | 10 | 31,340 | 12 | 22 | 45 |
| Loaded 240 mg Hg from N₂ gas containing 11,800 ppb Hg | | | | | |
| 122 | 80 | 32,800 | 8 | 10 | 20 |
| 123 | 80 | 34,720 | 6 | 10 | 40 |
| 124 | 80 | 36,640 | 7 | 11 | 36 |
| 125 | 80 | 38,560 | 8 | 11 | 27 |
| 126 | 10 | 39,280 | 9 | 11 | 18 |
| 127 | 10 | 39,520 | 6 | 7 | 14 |

These results demonstrate that the support contributes to the overall Hg adsorption, even though the results were much inferior to that with CuS deposited on it (comparing with examples 15–53).

EXAMPLES 128–151

Figure 5:
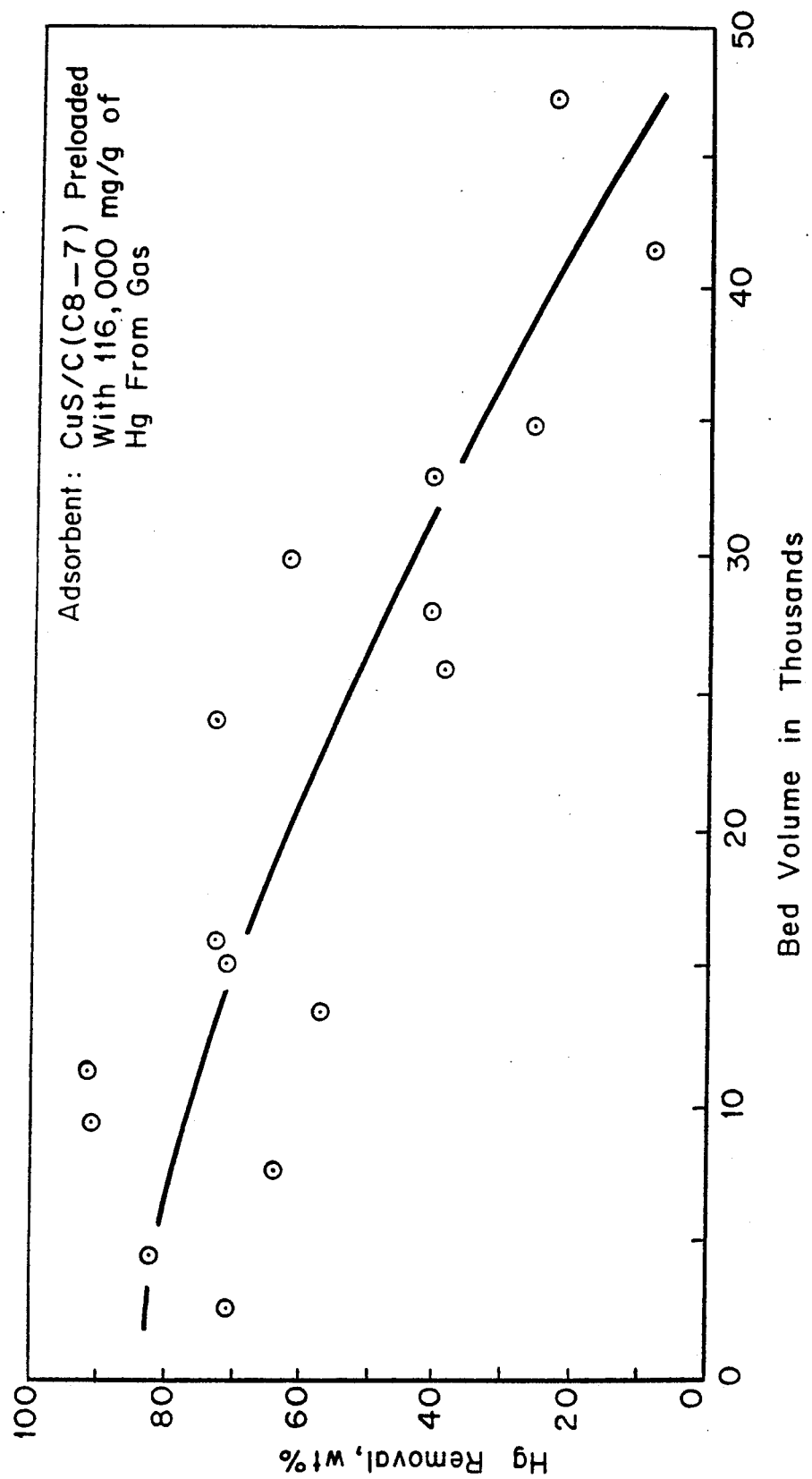
FIG. 5 is a graph illustrating the use of adsorbent composition to remove Hg from water containing very high levels of mercury.

The adsorbent as described in examples 15–53 was loaded with 116 mg of Hg/g from N₂ gas containing 11,800 ppb of Hg. The CuS/C remained active for treating about 10,000 bed volumes of water to remove an additional 0.75 mg/g of Hg. The results are shown in FIG. 5 and Table 5 below:

TABLE 5

Hg Removal From Water
Adsorbent: CuS/C
Preloaded with 11,600 mg Hg from N₂ gas
Temp., °F.: 110

| Example | LHSV | Bed Vol. | Hg, ppb Prod. | Hg, ppb Feed | Hg Removal % |
|---|---|---|---|---|---|
| 128 | 40 | 920 | 15 | — | — |
| 129 | 80 | 2,640 | 5 | 17 | 71 |
| 130 | 80 | 4,960 | 2 | 11 | 82 |
| 131 | 80 | 6,880 | 8 | 11 | 27(?) |
| 132 | 10 | 7,600 | 4 | 11 | 64 |
| 133 | 80 | 9,520 | 1 | 11 | 91 |
| 134 | 80 | 11,440 | 1 | 13 | 92 |
| 135 | 80 | 13,360 | 6 | 14 | 57 |
| 136 | 80 | 15,280 | 4 | 14 | 71 |
| 137 | 10 | 16,000 | 4 | 15 | 73 |
| 138 | 80 | 17,892 | 15 | 15 | 0(?) |
| 139 | 80 | 19,812 | — | — | — |
| 140 | 80 | 21,732 | 22 | 33 | 33 |
| 141 | 80 | 23,652 | — | — | — |
| 142 | 10 | 24,052 | 9 | 33 | 73 |
| 143 | 80 | 25,972 | 20 | 33 | 39 |
| 144 | 80 | 27,892 | 17 | 29 | 41 |
| 145 | 80 | 29,812 | 11 | 29 | 62 |
| 146 | 10 | 31,012 | — | — | — |
| 147 | 80 | 32,932 | 17 | 29 | 41 |
| 148 | 80 | 34,852 | 22 | 29 | 26 |
| 149 | 80 | 41,332 | 7 | 22 | 68 |
| 150 | 10 | 46,132 | — | 22 | — |
| 151 | 10 | 46,924 | 17 | 22 | 23 |

EXAMPLES 152–167

To simulate hydrocarbon contaminants in wastewater, 100 ppm of dodecyl benzen sulfonate were added to the feed water before equilibration with mercury. This is a severe test because hydrocarbon contamination in water is typically at 10 to 50 ppm.

Figure 6:
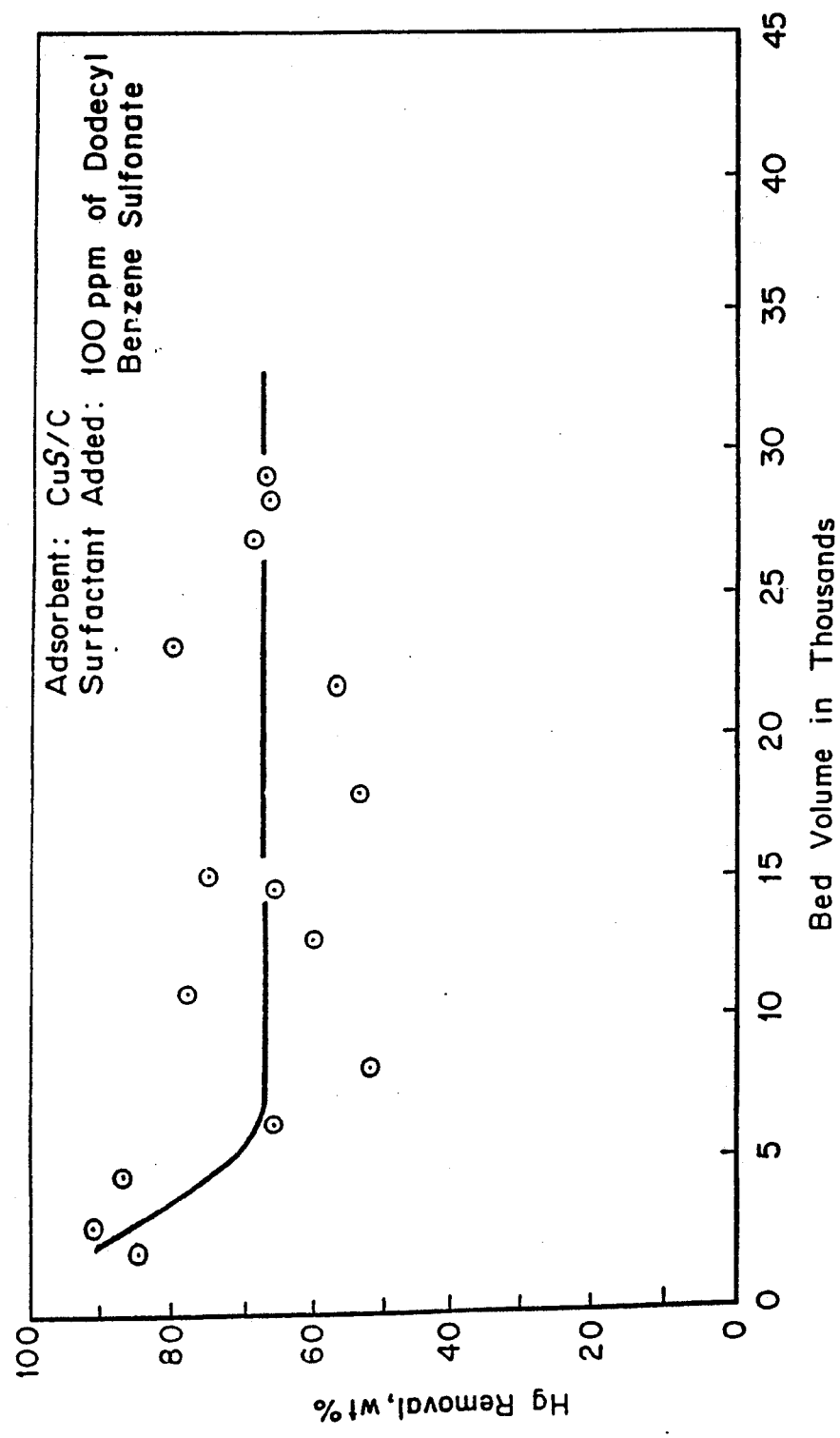
FIG. 6 is a graph illustrating the use of adsorbent composition to remove Hg from water containing organic contaminant.

The adsorbent CuS/C was prepared and tested as in examples 15–53 at a rate of 10 or 80 LHSV. The results are shown in FIG. 6 and Table 6 below:

TABLE 6

Hg Removal From Water
Adsorbent: CuS/C
Surfactant: 110 ppm of Dodecyl Benzene Sulfonate

| Example | LHSV | Bed Vol. | Hg, ppb Prod. | Hg, ppb Feed | Hg Removal % |
|---|---|---|---|---|---|
| 152 | 80 | 1,900 | 6 | 39 | 85 |
| 153 | 10 | 2,620 | 3 | 32 | 91 |
| 154 | 80 | 4,540 | 4 | 32 | 87 |
| 155 | 80 | 6,460 | 11 | 32 | 66 |
| 156 | 80 | 8,380 | 13 | 27 | 52 |
| 157 | 80 | 10,300 | — | — | — |
| 158 | 10 | 11,020 | 6 | 27 | 78 |
| 159 | 80 | 12,940 | 14 | 35 | 60 |
| 160 | 80 | 14,860 | 12 | 35 | 66 |
| 161 | 10 | 15,072 | 8 | 35 | 77 |
| 162 | 10 | 16,272 | 27 | 35 | 23 |
| 163 | 80 | 18,192 | 16 | 35 | 54 |
| 164 | 80 | 20,112 | 22 | 35 | 37 |
| 165 | 10 | 21,792 | 15 | 35 | 57 |
| 166 | 80 | 23,712 | 7 | 35 | 80 |
| 167 | 10 | 27,072 | 11 | 35 | 69 |

The results demonstrate that the adsorbent is surprisingly resistant to hydrocarbon contamination and remained effective for Hg removal from the highly contaminated water.

EXAMPLES 168–177

To simulate hydrocarbon contaminants in wastewater, 100 ppm of $C_8$–$C_{10}$ alcohol ethoxylate with the following approximate formula (Alfonic 810-60)

$$(CH_3)(CH_2)_{6-8}CH_2-(O-CH_2-CH_2)_5-OH$$

were added to the feed water before equilibration with mercury.

Figure 7:
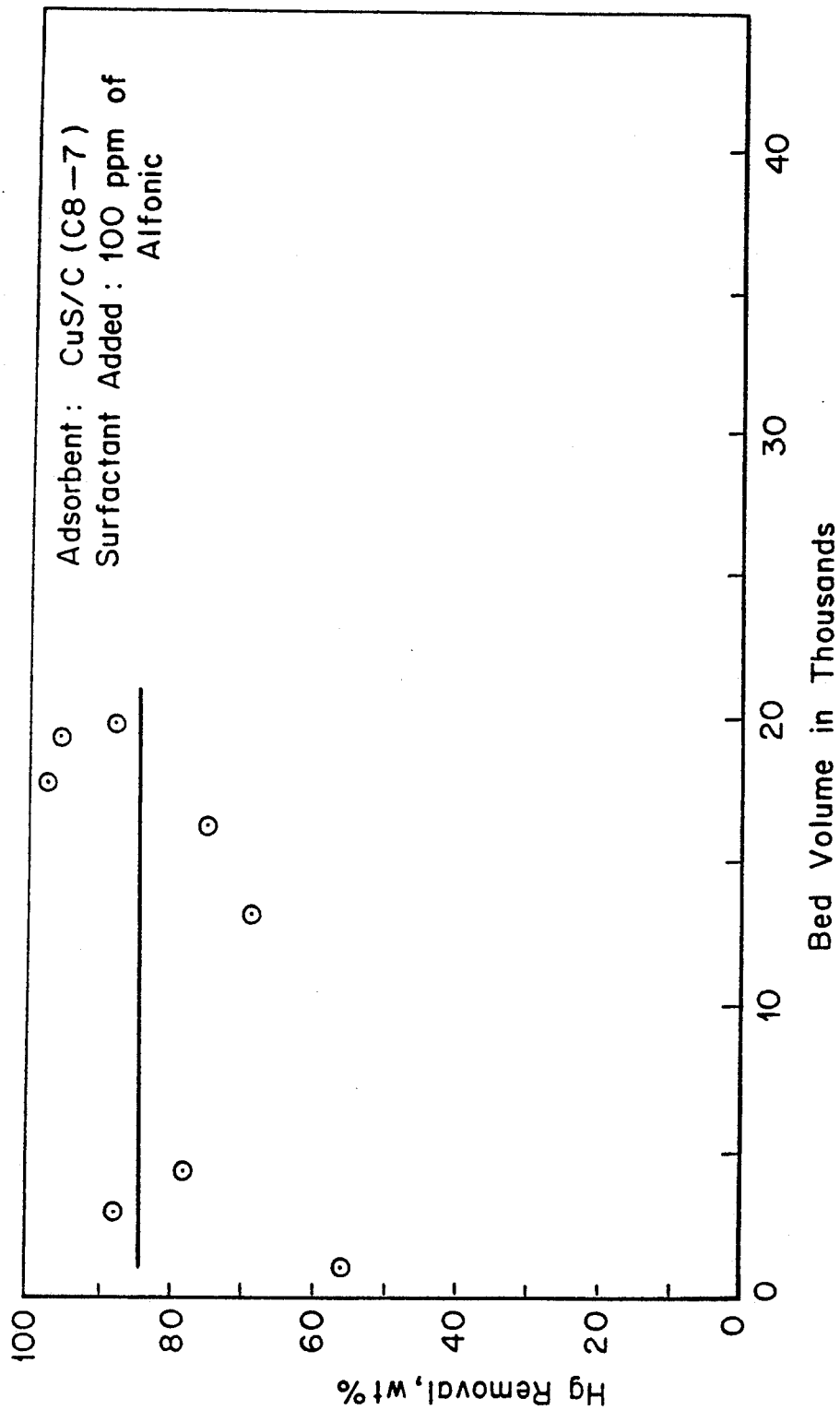
FIG. 7 is a graph illustrating the use of adsorbent composition to remove Hg from water containing another organic contaminant.

The absorbent CuS/C was prepared and tested as in examples 15-53 at a rate of 10 or 80 LHSV. The results are shown in FIG. 7 and Table 7 below.

TABLE 7

Hg Removal From Water
Adsorbent: CuS/C
Surfactant: 100 ppm of Alfonic

| Example | LHSV | Bed Vol. | Hg, ppb Prod. | Hg, ppb Feed | Hg Removal % |
|---|---|---|---|---|---|
| 168 | 10 | 1,120 | 14 | 32 | 56 |
| 169 | 80 | 3,040 | 4 | 32 | 88 |
| 170 | 80 | 4,960 | 7 | 32 | 78 |
| 171 | 80 | 6,880 | 22 | 32 | 31 |
| 172 | 10 | 7,600 | — | — | — |
| 173 | 80 | 13,360 | 10 | 32 | 69 |
| 174 | 10 | 16,480 | 8 | 32 | 75 |
| 175 | 10 | 17,920 | 2 | 80 | 98 |
| 176 | 10 | 19,420 | 3 | 78 | 96 |
| 177 | 10 | 19,872 | 13 | 107 | 88 |

The results show no impact on Hg removal by the contaminants in the feedwater.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A method for removing mercury from an aqueous wastestream to produce an environmentally acceptable discharge, the method comprising contacting the wastestream with an effective of an adsorbent composition having a particle size of from about 2 to about 200 mesh, said adsorbent composition comprising a metal compound which forms an amalgam and/or a sulfide with mercury, said metal compound selected from a group consisting of bismuth, copper, iron, gold, silver, tin, zinc and palladium in the form of metals, oxides and sulfides and a support, discharging the treated wastestream and regenerating the adsorbent composition.

2. The method of claim 1 wherein the aqueous wastestream contains organic and inorganic components.

3. The method of claim 1 wherein the contacting is at a temperature of from about 50° F. to about 570° F.

4. The method of claim 1 wherein the contacting is at fluid stream LHSV of from about 0.1 to about 100.

5. The method of claim 1 wherein the contacting is at a pressure of from about zero to about 3000 psi.

6. The method of claim 1 wherein the adsorbent includes a metal sulfide.

7. The method of claim 6 wherein the metal sulfide is CuS.

8. The method of claim 1 wherein the support is selected from the group consisting of $Al_2O_3$, $SiO_2$, $SiO_2/Al_2O_3$, zeolites, clays and active carbon.

9. The method of claim 8 wherein the support is active carbon.

10. The method of claim 1 wherein the method is continuous.

11. The method of claim 1 wherein the contacting is in a fluidized bed.

12. The method of claim 1 wherein the contacting is in a fixed bed.

13. The method of claim 1 wherein the mercury in the treated wastestream is reduced to a level of below about 10 ppb.

14. The method of claim 1 wherein the adsorbent composition is treated for regeneration by contacting with a low grade heat source with a temperature of at least 180° F., and a gas flow rate in V/VH of from about 1000 to about 100,000.

15. The method of claim 14 herein the low grade heat source is a hot gas.

16. The method of claim 15 wherein the gas is low pressure steam.

17. The method of claim 15 wherein the gas is flue gas.

18. The method of claim 15 wherein the gas flow of the low grade heat source is in a direction reverse to a flow direction of wastewater.

19. The method of claim 14 wherein the wastestream is an aqueous wastestream from petroleum processing and the heat source derives from a raw hot gas stream from an oil well.

20. The method of claim 1 wherein the adsorbent composition is selected from the group consisting of CuS/C, CuS/$Al_2O_3$, FeS/C, FeS/$Al_2O_3$, Ag/C, Ag/$Al_2O_3$, CuO/C, CuO/$Al_2O_3$, Bi/$Al_2O_3$, Ag/zeolite A and Au/C.

21. A method for removing mercury from an aqueous wastestream comprising:
    providing an adsorber vessel containing an adsorbent composition, the composition comprising a metal compound selected from a group consisting of bismuth, copper, iron, gold, silver, tin, zinc and palladium in the form of metals, oxides and sulfides and a support which comprises active carbon,
    introducing the wastestream into the adsorber vessel and into contact with the adsorbent composition therein at a temperature of from about 50° F. to about 570° F., a LHSV of from about 0.1 to about 100 and a pressure of from about zero to about 1000 psi,
    removing the contacted wastestream from the adsorber vessel,
    discharging the contacted wastestream,
    introducing a hot gas stream into the adsorber vessel and into contact with wastestream-contacted adsorber composition thereby regenerating the adsorber composition and producing a mercury-laden regeneration stream,
    removing the mercury-laden regeneration stream from the adsorber vessel.

22. The method of claim 21 wherein the adsorbent composition is in granular or pelletized form.

23. The method of claim 21 wherein the hot gas stream is introduced into the adsorber vessel in a flow direction which is reverse to a flow direction of the wastestream through the adsorber vessel.

24. The method of claim 21 which further comprises contacting the mercury-laden regeneration stream with sulfur/carbon adsorbent to remove the mercury from the gaseous stream.

25. The method of claim 21 wherein at least two adsorber vessels are provided so that one vessel can be used to treat wastestreams while another is being subjected to regeneration treatment.

26. The method of claim 21 wherein the wastestream contains organic and inorganic components and is from petroleum processing and the hot gas stream is a raw hot gas stream from an oil well.

27. The method of claim 21 wherein the wastestream is from a power plant and the hot gas stream is flue gas.

28. The method of claim 21 wherein the adsorbent composition has a particle size of from about 2 to about 200 mesh.

* * * * *